(12) United States Patent
Shankar et al.

(10) Patent No.: US 7,961,633 B2
(45) Date of Patent: Jun. 14, 2011

(54) METHOD AND SYSTEM FOR REAL TIME DETECTION OF THREATS IN HIGH VOLUME DATA STREAMS

(76) Inventors: Sanjeev Shankar, Waterloo (CA); Chris Thiessen, Kitchener (CA); Michael Corke, Guelph (CA); Sunil Bhargava, Fairfax, VA (US); Jeff He, Waterloo (CA)

( * ) Notice: Subject to any disclaimer, the term of this patent is extended or adjusted under 35 U.S.C. 154(b) by 941 days.

(21) Appl. No.: 11/633,626

(22) Filed: Dec. 5, 2006

(65) Prior Publication Data

US 2007/0136437 A1 Jun. 14, 2007

Related U.S. Application Data

(60) Provisional application No. 60/748,144, filed on Dec. 8, 2005.

(51) Int. Cl.
H04L 12/26 (2006.01)
(52) U.S. Cl. ........................................ 370/242; 709/224
(58) Field of Classification Search .................. None
See application file for complete search history.

(56) References Cited

U.S. PATENT DOCUMENTS

| 6,519,703 | B1 | 2/2003 | Joyce |
| 2002/0078381 | A1 | 6/2002 | Farley et al. |
| 2003/0051026 | A1 | 3/2003 | Carter et al. |
| 2003/0056092 | A1* | 3/2003 | Edgett et al. .................. 713/153 |
| 2003/0221004 | A1* | 11/2003 | Stupek et al. ................. 709/224 |
| 2004/0091916 | A1* | 5/2004 | Vandezande ....................... 435/6 |
| 2004/0111305 | A1* | 6/2004 | Gavan et al. ...................... 705/7 |
| 2004/0213289 | A1* | 10/2004 | Liu et al. ........................ 370/469 |
| 2006/0026688 | A1* | 2/2006 | Shah ................................. 726/25 |
| 2006/0028999 | A1* | 2/2006 | Iakobashvili et al. ......... 370/252 |
| 2006/0133699 | A1* | 6/2006 | Widrow et al. ................ 382/305 |

OTHER PUBLICATIONS

International Preliminary Report on Patentability and Written Opinion, dated Jun. 11, 2008, directed to corresponding International Application No. PCT/US2006/046421. 6 pages.

International Search Report and the Written Opinion of the International Searching Authority dated Sep. 4, 2007 directed to a counterpart application PCT/US2006/46421 (10 pages).

* cited by examiner

*Primary Examiner* — Jianye Wu
(74) *Attorney, Agent, or Firm* — McKenna Long & Aldridge LLP (57) ABSTRACT

A high speed detection system and method capable of generating audits of investigable patterns from log data using techniques for grouping and filtering the data so as to create vectors of patterns which can be then further analyzed by applying conditional filters to conclude that a threat may be active has been created to solve at least the above discussed problems.

28 Claims, 4 Drawing Sheets

METHOD AND SYSTEM FOR REAL TIME DETECTION OF THREATS IN HIGH VOLUME DATA STREAMS

CROSS-REFERENCE TO RELATED APPLICATION

This application claims the benefit of U.S. Provisional Application Ser. No. 60/748,144, filed Dec. 8, 2005.

BACKGROUND OF THE INVENTION

While there are many advantages to connecting internal computer networks to external networks, there is also the inherent danger of attacks. In order to minimize the danger of external attacks it is important to be able to detect threats as quickly as possible, preferably in real time, such that they can be blocked or otherwise disrupted before any harm is done.

While real time threat analysis has been a goal in network security, it has been an unattainable goal for several reasons. Network security alerting has been achieved by deploying a variety of security detection devices, also know as point devices, which analyze data flow in a network to identify threats and to generate alerts when threats are found. These devices are limited because they have a narrow view of the world in that they only see data and traffic which is either in-band (i.e. data actually flowing through the device) or that can be promiscuously sniffed from the wire (i.e. data that passes near the device when it is switched into promiscuous mode). In either case subnet topologies limit the view such devices have.

The known devices are further limited in that they attempt to identify threats based on the signatures of known and established attack vectors. In other words, these devices are only capable of identifying attacks from known attackers or attacks that are copies of attacks that have occurred before; they are unable to identify threats based on non-signature based traffic. The current devices can only flag well known and understood threats using very deterministic procedures, and while this may be effective in countering old attacks, it is of no use in discovering novel or non-signature based threats. Accordingly, network systems are left wide open to such new attacks which are capable of causing enormous amounts of damage.

As an alternative to the above discussed threat detection devices, network security systems also employ protection devices such as firewall and proxies. These protection devices log data streams that also contain threat information. However, the data logs that are generated are of little or no practical value because of their size; the rapid data flow through these devices results in excessively large data logs that were heretofore unwieldy for use in any sort of real time data analysis. Due to the size of the data logs and the volumes of seemingly irrelevant data it has been impractical to search through these logs for meaningful data to detect threat conditions.

SUMMARY OF THE INVENTION

According to various embodiments of the invention, a high speed threat detection system may include: a plurality of network sources to generate network event data comprising a plurality of raw events; a data analysis unit to receive the network data from the network sources, the database analysis unit including, a relational database engine to analyze batches of the network data to detect patterns in the data, a high speed slicing unit to package the network data into a plurality of time based slices, a pattern identification unit to identify which of the detected patterns are to be reviewed by an operator, and an output device to output the patterns to be reviewed by the operator.

According to various embodiments of the invention, a high speed threat detection system may further include a memory to store the detected patterns.

According to various embodiments of the invention, the output device is a computer monitor.

According to various embodiments of the invention, at least on of the network sources is a firewall.

According to various embodiments of the invention, the relational database engine analyses the batches of data an event filter.

According to various embodiments of the invention, the relational database engine analyses the batches of data based on rate-detection.

According to various embodiments of the invention, the relational database engine analyses the batches of data based on rare value detection.

According to various embodiments of the invention, the relational database engine analyses the batches of data using a pattern filter.

According to various embodiments of the invention, the relational database engine analyses the batches of data in real time.

According to various embodiments of the invention, the relational database engine analyses the batches of data in polynomial time.

According to various embodiments of the invention, the data analysis unit is a processor.

According to various embodiments of the invention, at least one of the plurality of slices is one of a table, a memory or a memory based file.

According to various embodiments of the invention, a method of detecting network threats may include: receiving network data from a plurality of network sources; loading the network data into a plurality of generic slices, each of the generic slices comprising a predetermined amount of data; generating pattern-specific slices from the generic slices based on a plurality of relational attributes; organizing the pattern-specific slices into a plurality of windows, wherein each window comprises a rolling set of adjacent slices; determining if a pattern is present in at least one of the windows; and storing determined patterns in a memory.

According to various embodiments of the invention, a method of detecting network threats may further include applying conditionals to patterns stored in the memory to determine if a threat situation can be concluded.

According to various embodiments of the invention, each of the generic slices comprises an amount of data associated with a predetermined period of time.

According to various embodiments of the invention, each generic slice comprises data associated with one minute of time.

According to various embodiments of the invention, the network data is loaded into generic slices so as to collate time-related data together.

According to various embodiments of the invention, at least two of the windows are of different sizes.

According to various embodiments of the invention, the pattern-specific slices may be incorporated into or removed from a window based on time.

According to various embodiments of the invention, the pattern-specific slices may be incorporated into or removed from a window based on a presence of patterns in the slices.

According to various embodiments of the invention, a slice is deleted when it exits a window.

According to various embodiments of the invention, the determining if a pattern is present in at least one of the windows comprises applying at least one filter to each window to determine if a pattern is present.

According to various embodiments of the invention, a method of detecting network threats may further include storing all of the generic slices to aid in forensic analysis or reporting.

According to various embodiments of the invention, a method of detecting network threats may further include persisting at least one audit, wherein the audit comprises at least one pattern instance.

According to various embodiments of the invention, a method of detecting network threats may further include deleting all slices which do not contain pattern related information.

According to various embodiments of the invention, at least one of the network sources is a networked source.

According to various embodiments of the invention, the plurality of windows may comprise at least one of a time based window, a value based window, or a count based window.

According to various embodiments of the invention, at least one of the plurality of pattern-specific slices is one of a table, a memory or a memory based file.

According to various embodiments of the invention, a machine readable storage medium may store a program, wherein when the program is executed it performs a method including: receiving network data from a plurality of network sources; loading the network data into a plurality of generic slices, each of the generic slices comprising a predetermined amount of data; generating pattern-specific slices from the generic slices based on a plurality of relational attributes; organizing the pattern-specific slices into a plurality of windows, wherein each window comprises a rolling set of adjacent slices; determining if a pattern is present in at least one of the windows; and storing determined patterns in a pattern store.

DETAILED DESCRIPTION OF THE INVENTION

A high speed detection system and method capable of generating audits of investigable patterns from log data using techniques for grouping and filtering the data so as to create vectors of patterns which can be then further analyzed by applying conditional filters to conclude that a threat may be active has been created to solve at least the above discussed problems.

A pattern may be defined as a predefined data relationship to be discovered in the event stream. For example, a pattern may be a network connection between a source and any of a number of targets within a given time period. In this example, pattern audits are the sets of all such instances of patterns. Accordingly, if a pattern is the connection between a given source A and any one of four targets 1, 2, 3 and 4, a pattern audit would be a set of all of the connections between A and 1, 2, 3 or 4 within a given time period T.

The event stream is made up of a series of events, and each event may be pre-processed by a parsing engine. Such a parsing engine may be up-stream of a threat detection system according to various embodiments of the invention. Each event may be broken up into a set of pre-defined data columns called keys. Doing so enables the system to treat an event as a set of Key-Value pairs (hereinafter, "KVPs") thereby enhancing the system's ability to group and filter events.

One embodiment of the invention is a system which is capable of identifying pre-defined relationship patterns by analyzing very high volume data in real time. In another embodiment of the invention the system is capable of identifying pre-defined relationship patterns by analyzing very high volume data in polynomial time. By dynamically analyzing data in real time the preferred embodiment of the invention provides a much more useful and robust threat detection system than has previously been available.

Polynomial time may refer to the computation time of a problem where the time, m(n), is no greater than a polynomial function of the problem size, n, wherein $m(n)=O(n^k)$ in which k is a constant. In some cases, operations performed in polynomial time may be considered "fast" computations, while operations performed in "super-polynomial time" may be considered to be slower computations. Exponential time may be an example of a super-polynomial time. Polynomial time may also be considered to be the smallest time-complexity class on a deterministic machine which is robust in terms of machine model changes.

In order to broaden the range of data to be searched for threats, a preferred embodiment of the present invention gathers its data from log data from devices traditionally thought of as prevention devices, such as firewalls, to create a world view of data. By using these large amounts of data, the embodiment is able search much more thoroughly for previously undetectable active threats.

In order to perform real time analysis of the large volumes of data typically associated with prevention devices, an embodiment of the invention has been designed to receive an enormous number of raw events (up to 1 billion/day or more), and reduce them to a much smaller number of patterns and/or threats. By reducing the data to the much smaller number of patterns and/or threats, the user and/or system is then able to analyze the patterns more expeditiously. In a preferred embodiment, the number of alertable patterns and/or threats is reduced to a human-reviewable rate of approximately 1000 per day. Alertable patterns are those patterns which have been recognized as probable threats. Other patterns, which may or may not have been recognized as threats, but which have been otherwise determined to be notable, may in some embodiments be saved for reporting purposes, or for additional purposes such as determining future threats. These patterns may be detected and/or stored at higher rates. In some embodiments, these higher rates are acceptable because the patterns will not be reviewed by humans and are stored to be further analyzed at a later time.

Various embodiments use various methods to reduce the raw data to alertable and/or notable patterns. According to various embodiments, the reduction may be accomplished by employing at least one of the following methodologies: grouping and filtering (e.g. an Event Filter); rate-detection (e.g. a 1-Many Rate method); rare value detection (e.g. a Rare Value method); and/or post-filtering of patterns (e.g. a Pattern Filter).

Rate-Dectection methodologies may function by detecting the rate at which specified key values appear during a predetermined time window. For example a rate detection system may determine that a specific key value appears X times during a time period T.

A 1-Many Rate methodology may utilize a pattern which is based on a relationship between unique 'many_keys' and at least one 'one_keys'. A 'many-keys' may be defined as a set of KVPs, while a 'one key' may be a single KVP. A 1-Many Rate based system may determine a rate at which the 'one key' is matched to any of the KVPs in the 'many_keys' within a predetermined time period. Various embodiments of such a system may determine a rate in relation to a predetermined threshold; the predetermined time period may be a rolling window.

An Event Filter may be a pass-through filter for events where events of a predefined type make up a pattern. Event filters are particularly useful when a single event itself is wholly sufficient to describe a pattern. An exemplary event filter may group all events having the same value in a KVP, while further exemplary event filters may group similar events occurring within a predetermined time window in a KVP.

A Rare Value Pattern methodology may be used to detect values that have not been detected over a predetermined period of time; this time period may be known as a timeout. An exemplary system using a rare value pattern methodology may group values based on time windows in which the values were detected.

A system which utilizes a post filtering of patterns may be used to reconcile patterns with filter expressions. For example, a 1-Many rate may be raised to a higher importance level based on a value of one of the parts of the pattern. Such a system may also utilize a meta pattern and/or group initial patterns into meta patterns. A meta-pattern may be defined as a pattern of patterns. For example, when identifying "single source to multiple targets" patterns occurring within a specified time window, a meta-pattern's time-window may be the same time window, a sub-set of the pattern's time window, or a super-set of the pattern's time window.

Some embodiments of the invention use combinations of these methodologies.

Figure 1:
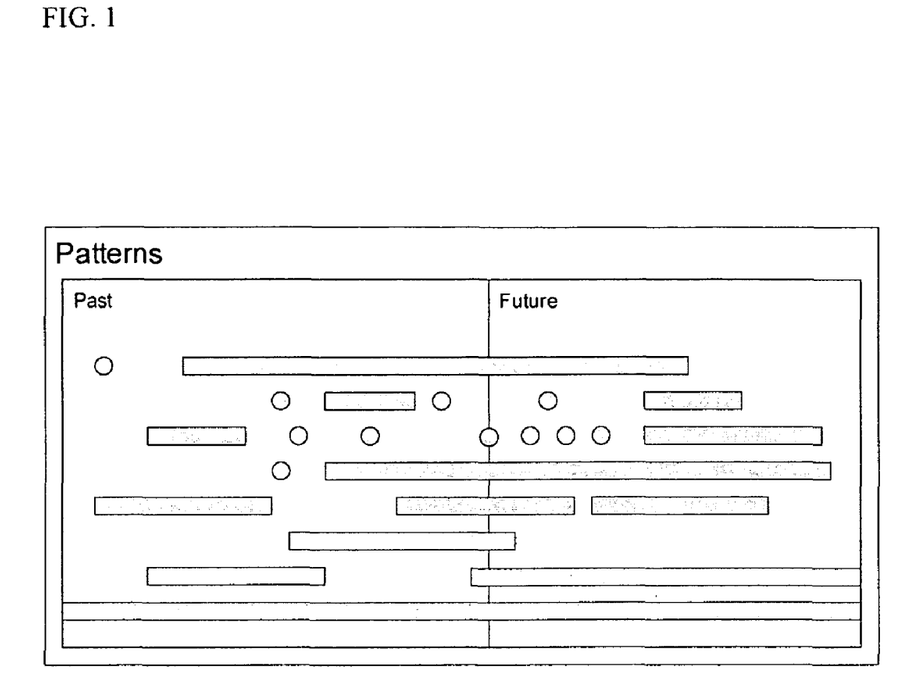
FIG. 1 depicts an example of patterns viewed over time, according to various embodiments of the invention.

Log-events are considered to be point events, meaning that the events correspond to a specific moment in time. Patterns, however, extend across a period of time. As shown in FIG. 1, at any given moment in time, some patterns may have been completed (the pattern occurred in the past), while some patterns may be partially completed, and other patterns may be entirely in the future (the patterns have not yet occurred). Some patterns, known as point events, may occur such that they have start and end times that are the same. However, it's more helpful to consider patterns as extending over a period of time.

In a preferred embodiment, the filtering of log data into patterns is achieved by implementing sort/filter code as part of a generation engine. In an exemplary embodiment, the system offloads this process to a relational database engine to improve the speed at which the filtering can be achieved. In order to improve the speed of filtering, the relational database engine may be specially tuned to search, filter and/or group relational information in a more expedient manner. In an embodiment of the invention, the off-loading is performed by defining a pattern in relational terms, for example 1-to-many rate, many-to-many rate, etc. In one embodiment, the system decomposes the input data (which is generally raw data, but may be preprocessed data) into a common normalized form. This normalized form may then be modeled as a relational schema. Once data is in a relational schema, a pipeline of include, exclude and/or grouping filters may be applied to the data to condense it down to the desired pattern form.

Due to the large amounts of raw data involved, and the speeds at which the data may be continuously input, a preferred embodiment of the invention adheres to the maxim that 'old-news is stale news'. In other words, old data doesn't have the same value as new data. Accordingly, in a preferred embodiment, once batch of data has been filtered to generate the next stage in a pattern pipeline, the older stage is no longer needed and may be discarded. This technique allows the preferred embodiment to use a relational database system in a main-memory mode (RAM) wherein it operates with minimized or reduced access latencies and thus becomes very high-performing.

Figure 2:
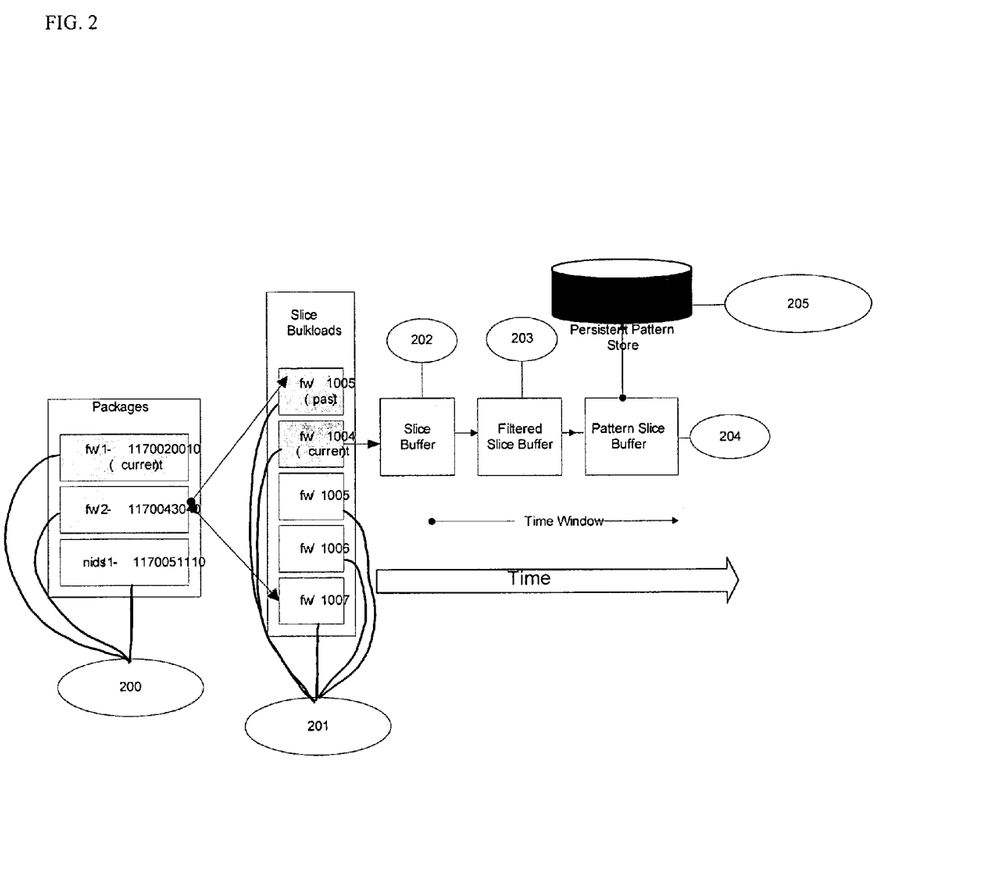
FIG. 2 depicts an example of a system by which patterns are detected, according to various embodiments of the invention.

An exemplary data flow pipeline according to an embodiment of the invention is shown in FIG. 2, which depicts a plurality of buffers represented by a database table. Each temporary buffer is deleted as the filtering conditions are applied to it and the next stage temporary buffer is created. Deleting the temporary buffers as they become unnecessary allows the RAM to be operated in an efficient manner thus allowing high-bandwidth database computation. While it is possible, it may not be desirable in a preferred embodiment to create permanent storage areas in the RAM, as this may cause the RAM to perform at less than optimal levels. There may be situations however, in alternate embodiments, where it becomes desirable to reserve sections of the RAM for permanent or semi-permanent storage areas.

Figure 3:
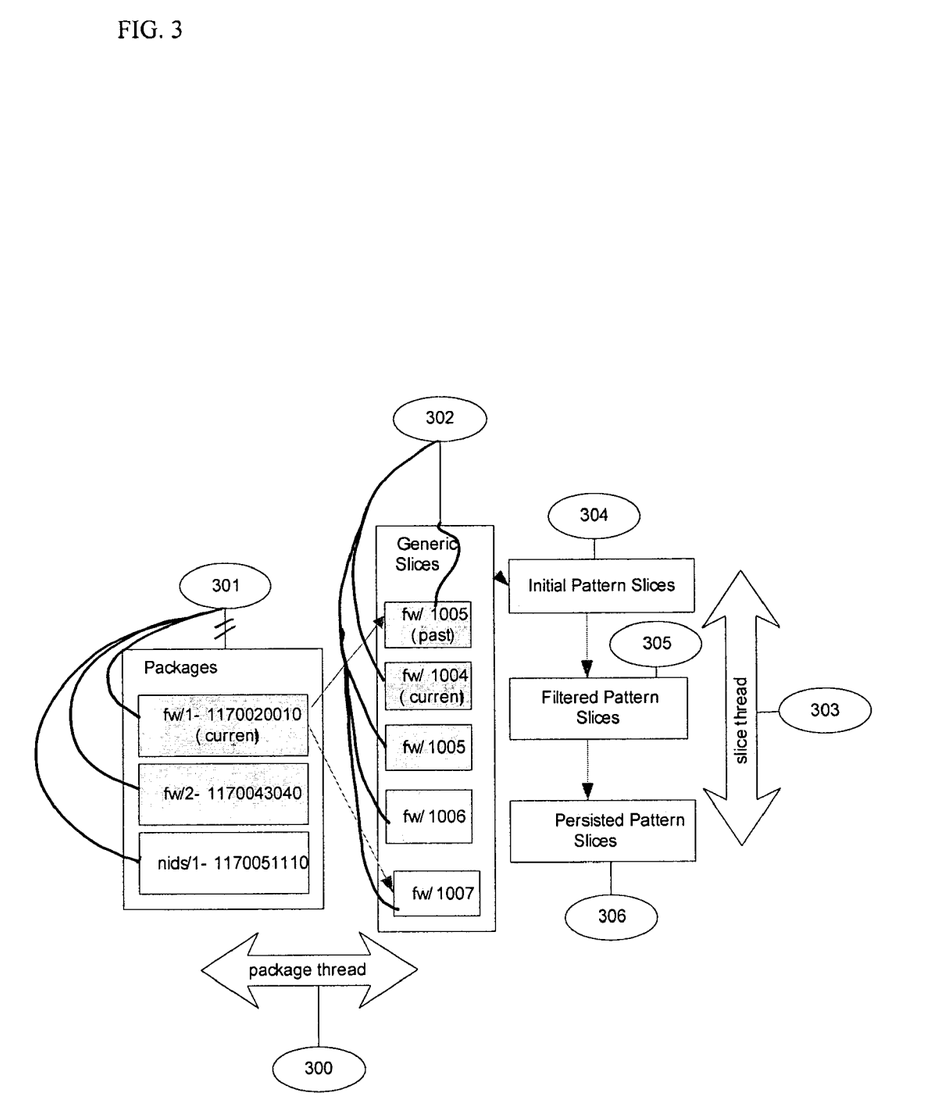
FIG. 3 depicts an example of a threat detection system, according to various embodiments of the invention.

In the embodiment depicted in FIG. 2, data arrives at the inbox of the system grouped into a plurality of packages 200. Each package 200 is a group of events from either a single source or multiple sources which may have been normalized by up stream processing. Each package 200 is then loaded into a slice 201. A slice 201 may be defined in this example as a time-defined "chunk" or collection of time-series data. The slices 201 may directly correspond to the packages 200 such that there is a directly relation, i.e. a one-to-one correlation, or the packages 200 may be loaded into slices 201 such that a different relationship is present. Initially the packages 200 are loaded into generic slices 201, so as to maintain time-related data together. From these generic slices 201 pattern specific slices are generated in the pattern slice buffer 202 based on the set of relational attributes each pattern needs, as shown in FIG. 3 and described below.

The pattern specific slices are then loaded into at least one filtered slice buffer 203, the pattern specific slices can be loaded into a single filtered slice buffer 203 or into a plurality of buffers 203, in some embodiments, each pattern specific slice may be loaded into its own buffer 203. The filtered slices are then drive at least one pattern slice buffer 204. According to various embodiments, a plurality of pattern slice buffers 204 are used, and they are organized into time windows based on the configuration of the patterns. For example, the pattern slice buffers 204 may be arranged into a rolling set of adjacent slices. Furthermore a method, such as a "1-Many Rate," may then be used to detect the rate of unique values in at least one of the time windows. Each pattern may have a different window size.

In the system depicted, slices may enter or exit a window based on a time associated with the slice and the presence of a pattern or patterns in a slice. Once a slice has exited a window, usually permanently, it has little relevance to a current pattern being detected. Filters may be applied in the window, and therein to the constituent slices, to determine if a pattern can be established. Once a pattern is established may then be moved to a persistent pattern store 205, which may be a semi-permanent location. Once a pattern starts getting detected, slices related to the pattern may be stored, or persisted. Storing the slices simplifies and improves recovery from system fault/crashes and may help in scenarios wherein a pattern needs to be regenerated at a much later stage in time, perhaps for potential forensic or reporting purposes. The persistent pattern storage may be any type of data storage, such as a memory.

In a preferred embodiment, each pattern algorithm defined in the system is implemented by a Java class. These classes may then farm out the bulk of the work to the relational database engine while most of the data is held in heap tables. Alternate embodiments implement the pattern algorithms using other methods. Some of these methods may include, but are not limited to, non-garbage collected, flattened data structures in Java, use of dynamic compilation, custom native code which implements high-performance data structures and algorithms.

When processing the raw data in a preferred embodiment, the input raw data is loaded into 'slices', where each slice encompasses a predetermined amount of data. In a preferred embodiment, the slices are defined by a time period represented by the data. In one preferred embodiment, each slice is defined as containing a minute-bound chunk of time-series data. Initial the raw data may be loaded into generic slices, so as to collate time-related data together.

As detailed above, pattern specific slices may be generated from generic slices (such as slices 201 in FIG. 2) based on a set of relational attributes defined by patterns. As shown in FIG. 3, generic slices 302 may be created using a package thread 300. Packages 301 arrive at the system's inbox and are pre-created as sets of time-series data. In an exemplary embodiment, each package 301 may be made up of a one minute data series. The package thread 300 loads the packages 301 into memory based slices 302. In an embodiment in which each package contains a one minute data series, each slice 302 may also contain one minute worth of data. It is important to note that the size of the slices 302 do not have to correspond to the size of the packages 301.

At this point the generic slices may be formed into an unfiltered collection which is only grouped by time. A slice thread 303 may then begin processing the slices 302 as follows. Each slice may be filtered using configuration defined pattern slice filters into initial pattern slices 304. The filters then determine which of the events from the generic slices 302 may potentially be a part of a pattern. The filters then generate filtered pattern slices 305. The filtered pattern slices 305 may then be stored in the pattern store as persisted pattern slices 306. The filtered pattern slices 305 may then be organized into windows, where each window may represent a rolling set of adjacent slices. Each pattern may have a different window size. Slices may be incorporated into or removed from a window based on time and/or the presence of patterns in a slice.

In a preferred embodiment, once a slice has permanently exited a window it has little relevance to the current pattern being detected and may thereafter be discarded. For example, a "1-Many Rate" may be used to detect the rate of a unique value in a window. In this example the algorithm may detect the number of occurrences of a specific pattern in a ten minute period. Once a pattern has been present for ten minutes it is removed from the window and discarded allowing for new patterns to enter the window should they occur.

In a further preferred embodiment slices may be implemented as dynamically created relational database tables which hold time-defined chunks of event data. These slice tables may be created in RAM storage, thereby allowing for high speed access. In another preferred embodiment slices may be created as files on a RAM based file system.

In a preferred embodiment, multiple filters are applied to each window, and to the constituent slices therein, to determine if a pattern can be established. When a pattern is established, the pattern is then moved to a pattern store which is a semi-permanent location. In a preferred embodiment of the invention, all slices are stored, thereby allowing for recovery from system faults/crashes and for regeneration of the patterns at a latter time should that be desirable for purposes such as forensic analysis or reporting. Furthermore, by saving all of the slices, it is possible to extract different types of data. For example, if at a later time an additional threat is determined, the data can be analyzed to look for occurrences of the newly discovered threat. Also, the slices may be examined to look for patterns over different periods of time than originally intended. In an alternate embodiment of the invention, once a pattern is detected only slices related to the pattern are stored.

In a preferred embodiment, once a pattern has been placed in the pattern stores it will have a set of conditionals applied to it to deduce if a threat situation can be concluded. In an embodiment of the invention, a zero-set is applied to the pattern when it is determined that the pattern is a threat. Counts of patterns over a time period, inclusion/exclusion of a particular data value in a pattern are examples of such conditionals. Further examples may include, but are not limited to: event, alert and/or threat history of involved network entities; detected security vulnerabilities of involved network entities; user-entered watch lists of network entities, users, etc.; and user-entered or automatically derived business or other significance of involved network entities, users, etc. In a preferred embodiment of the invention, the network entities are hosts.

In a further embodiment of the invention, threats may be ranked according to their significance in light of vulnerabilities particular to the system or systems being protected.

One of the advantages to being able to analyze large amounts of batch data in real time is that algorithms can be used to detect abnormal patterns that are not know prior to being identified. In other words, the system can be set to look for any patterns or series of patterns that are not normal. When such patterns are discovered the system can identify them as threats in real time to minimize any negative effect they may have on the system. The newly identified patterns can then be highlighted and transferred to human operators to determine if the threat is real or if the pattern is merely an anomaly. The algorithm can then be changed to incorporate the new information. By utilizing this feature, the system is able to provide a real time, minimal or possibly zero delay, threat analysis heretofore not possible. In some embodiments, such algorithms can be implemented using fuzzy logic, Bayesian filtering, neural nets, Markov models, and other statistical, deterministic, and/or non-deterministic methods.

Figure 4:
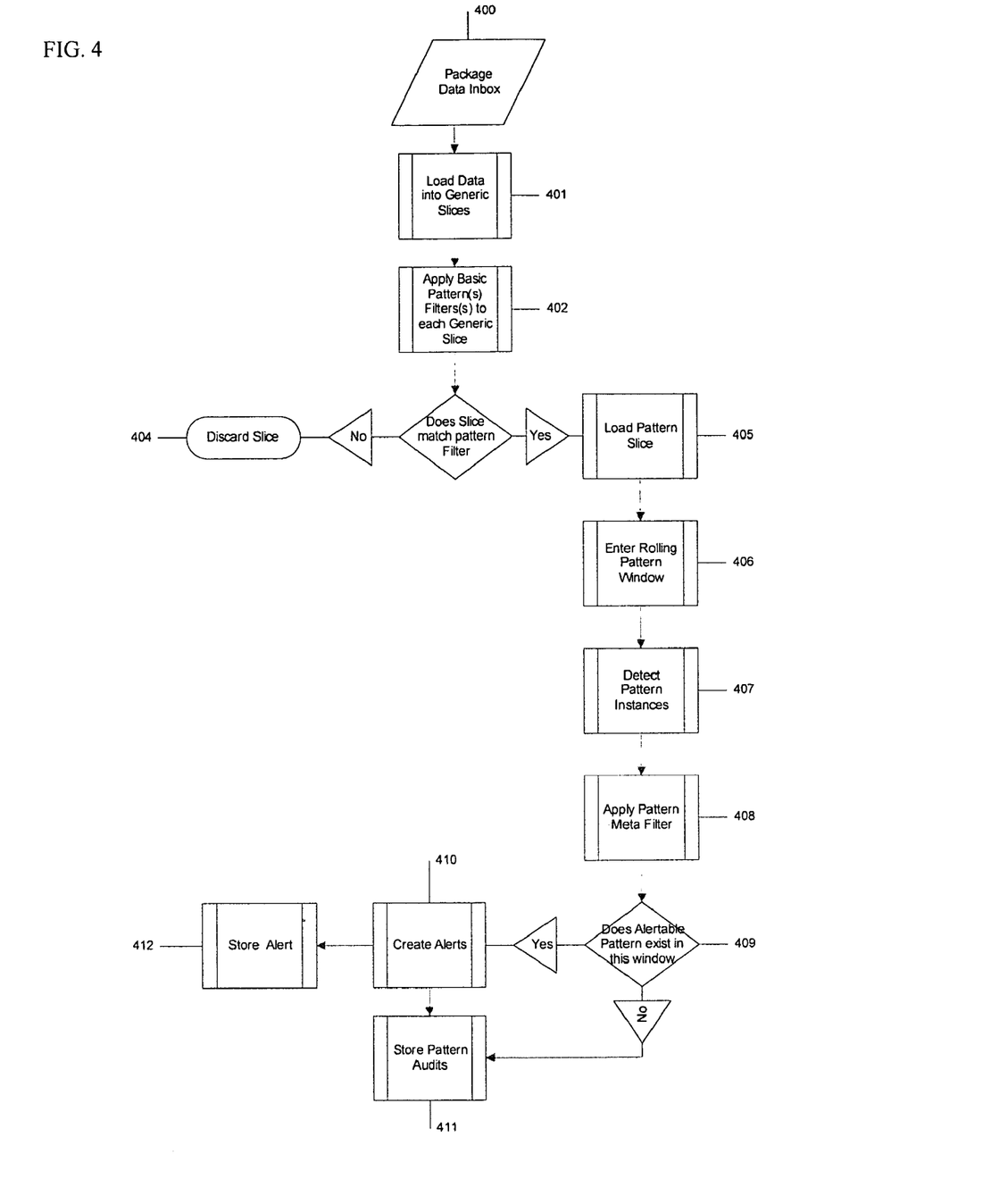
FIG. 4 depicts an exemplary flowchart describing a high speed threat detection system, according to various embodiments of the invention.

FIG. 4 depicts an exemplary flowchart describing a high speed threat detection system, according to various embodiments of the invention. As shown in FIG. 4, packages, which may be made up of event data, arrive at the package data inbox 400. The packages are then loaded into generic slices 401, after which pattern filters are applied to each of the generic slices to determine if any of the slices match the data relationship requirements for any pattern 402. Generic slices which are not suitably matched to a pattern may then be discarded 404. Generic slices which do match the pattern filter are then loaded into pattern slices 405. The pattern slices then enter a rolling pattern window 406, which may be a rolling time window representing the time boundary over which a pattern emerges from the collection of slices. Pattern instances are then detected 407 within the rolling pattern window. Pattern meta-filters are then applied to the detected pattern instances 408 to help determine if actionable patterns exist within the rolling pattern window 409. If such alertable patterns exist, then pattern alerts are created 410 and stored 412. If such alertable patterns do not exist, pattern audits may be stored 411.

We claim:

1. A high speed threat detection system, comprising:
a plurality of network sources to generate network data comprising a plurality of raw events; and
a data analysis unit to receive the network data from the network sources, the data analysis unit comprising
a slicing unit to package the network data into a plurality of slices, wherein each of the slices comprises a predetermined chunk of the network data,
a relational database engine to
organize the slices into a plurality of windows, wherein each window is associated with a distinct pattern, comprises a rolling set of the slices that match a data relationship requirement for the distinct pattern associated with the particular window, and comprises a fixed time boundary over which the slices enter and exit the particular window and over which the distinct pattern associated with the particular window can emerge from the rolling set of slices, and
analyze, for each window, the corresponding rolling set of slices to detect an instance of the pattern associated with the particular window, and
a pattern identification unit to identify which of the detected pattern instances are to be reviewed by an operator, and
an output device to output the pattern instances to be reviewed by the operator.

2. The system of claim 1, further comprising a memory to store the detected pattern instances.

3. The system of claim 1, wherein the output device is a computer monitor.

4. The system of claim 1, wherein at least one of the network sources is a firewall.

5. The system of claim 1, wherein the relational database engine analyzes the rolling sets of slices based on an event filter.

6. The system of claim 1, wherein the relational database engine analyzes the rolling sets of slices based on rate-detection.

7. The system of claim 1, wherein the relational database engine analyzes the rolling sets of slices based on rare value detection.

8. The system of claim 1, wherein the relational database engine analyzes the rolling sets of slices using a pattern filter.

9. The system of claim 1, wherein the relational database engine analyzes the rolling sets of slices in real time.

10. The system of claim 1, wherein the relational database engine analyzes the rolling sets of slices in polynomial time.

11. The system of claim 1, wherein the data analysis unit is a processor.

12. The system of claim 1, wherein the slices are implemented in one of a table in a memory or a memory based file.

13. A method of detecting network threats, comprising:
receiving network data from a plurality of network sources;
loading the network data into a plurality of slices, each of the slices comprising a predetermined chunk of the network data;
organizing the slices into a plurality of windows, wherein each window is associated with a distinct pattern, comprises a rolling set of the slices that match a data relationship requirement for the distinct pattern associated with the particular window, and comprises a fixed time boundary over which the slices enter and exit the particular window and over which the distinct pattern associated with the particular window can emerge from the rolling set of slices;
determining if an instance of the pattern associated with each of the windows is present in the corresponding rolling set of slices associated with each particular window; and
storing determined pattern instances.

14. The method of claim 13, further comprising applying conditionals to the stored pattern instances to determine if a threat situation can be concluded.

15. The method of claim 13, wherein each of the slices comprises an amount of data associated with a common predetermined period of time.

16. The method of claim 15, wherein the predetermined period of time is one minute.

17. The method of claim 13, wherein the network data is loaded into the slices so as to collate time-related data together.

18. The method of claim 13, wherein at least two of the windows are of different sizes.

19. The method of claim 13, wherein the slices may be incorporated into or removed from a window based on time.

20. The method of claim 13, wherein a slice is deleted when it exits a window.

21. The method of claim 13, wherein the determining if an instance of the pattern associated with each of the windows is present comprises applying at least one filter to each window to determine if an instance of the pattern is present.

22. The method of claim 13, further comprising archiving all of the slices to aid in forensic analysis or reporting.

23. The method of claim 13, further comprising persisting at least one audit, wherein the audit comprises at least one pattern instance.

24. The method of claim 13, further comprising deleting all slices which do not contain pattern related information.

25. The method of claim 13, wherein at least one of the network sources is a networked source.

26. The method of claim 13, wherein the plurality of windows comprises at least one of a time based window, a value based window, or a count based window.

27. The method of claim 13, wherein the slices are implemented as one of a table in a memory or a memory based file.

28. A non-transitory machine readable storage medium storing a program, wherein when the program is executed it performs a method comprising:
receiving network data from a plurality of network sources;
loading the network data into a plurality of slices, each of the slices comprising a predetermined chunk of the network data;

organizing the slices into a plurality of windows, wherein each window is associated with a distinct pattern, comprises a rolling set of the slices that match a data relationship requirement for the distinct pattern associated with the particular window, and comprises a fixed time boundary over which the slices enter and exit the particular window and over which the distinct pattern associated with the particular window can emerge from the rolling set of slices;

determining if an instance of the pattern associated with each of the windows is present in the corresponding rolling set of slices associated with each particular window; and storing determined pattern instances in a pattern store.

* * * * *